Figure 1:
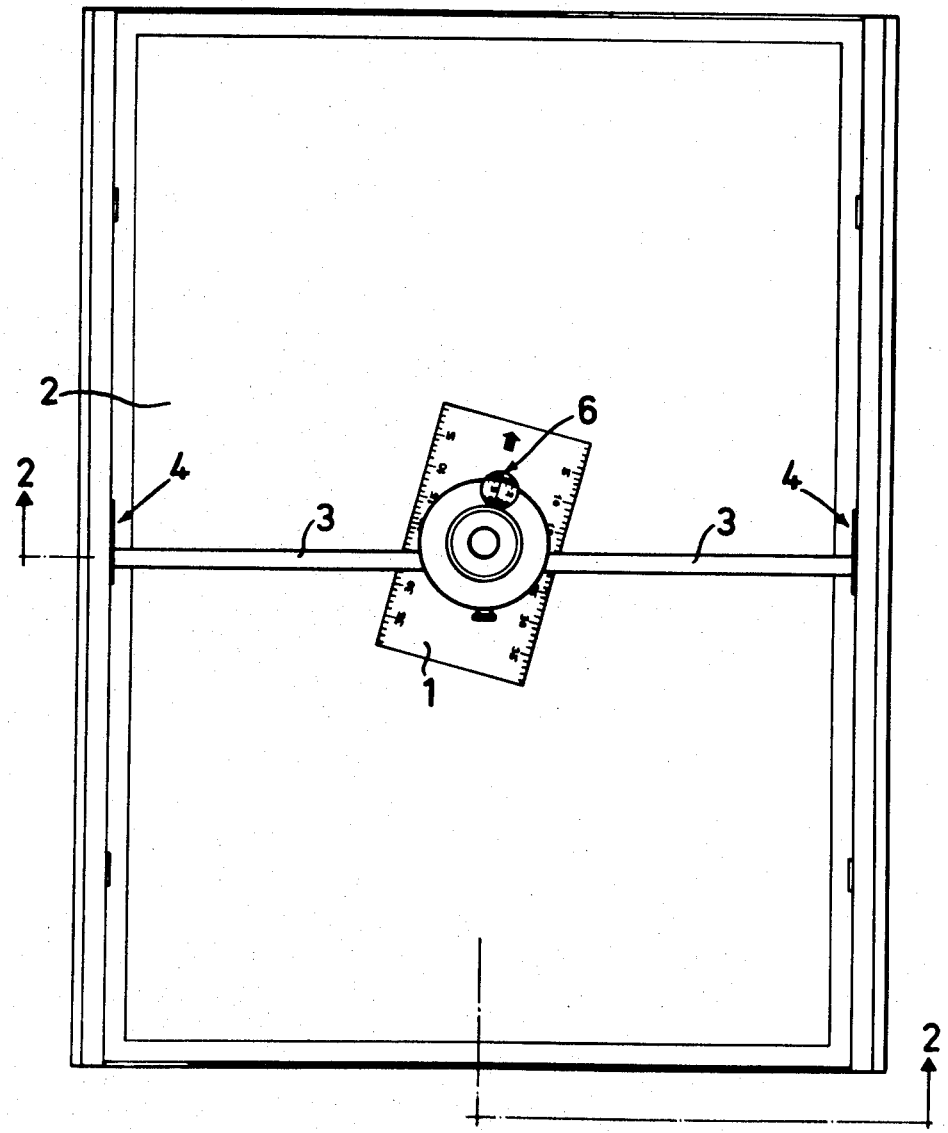

United States Patent [19]
Johansson

[11] 3,846,913
[45] Nov. 12, 1974

[54] APPARATUS FOR DETERMINATION OF COURSES ON NAUTICAL CHARTS ETC.

[76] Inventor: Odd Olov Johansson, Medsommarvagen 215-126-35, Hagersten, Sweden

[22] Filed: May 15, 1972

[21] Appl. No.: 253,037

[52] U.S. Cl.................... 33/76 V, 33/1 SD, 33/80
[51] Int. Cl............................................. B43l 13/08
[58] Field of Search....... 33/1 SD, 76 R, 76 VA, 80, 33/75 R

[56] References Cited
UNITED STATES PATENTS

| | | | |
|---|---|---|---|
| 964,773 | 7/1910 | Guillo | 33/80 |
| 1,436,415 | 11/1922 | Sullivan | 33/80 |
| 2,557,981 | 6/1951 | Larsen | 33/76 VA |
| 2,701,918 | 2/1955 | Phelps | 33/80 |
| 2,770,042 | 11/1956 | Hone | 33/75 R |
| 3,393,458 | 7/1968 | Freda | 33/76 R |

Primary Examiner—William D. Martin, Jr.
Attorney, Agent, or Firm—Fred Philpitt

[57] ABSTRACT

Apparatus for determining course on a chart including a rectangular plate that is adapted to hold a chart, parallel racks mounted along two opposite sides of said plate, a guide shaft disposed above and parallel to said rectangular plate, gear wheels provided at the opposite ends of said guide shaft which are positioned to mesh with and engage the underside of said parallel racks, a carrying device slideably mounted on said guide shaft and moveable along said shaft and associated with a course rule that is rotatable about a vertical shaft that is perpindicular to said plate, said course rule being adapted to bear against a chart placed on said plate, said parallel racks being spaced above said plate with the teeth of said racks facing said plate, a spring force acting between the carrying device and the course rule so as to urge the course rule towards the chart and the carrying device away from the chart, whereby there is achieved great reading accuracy between the course rule and the chart and great exactness in the movement of the guide shaft in a direction normal to its axis is obtained by the gear wheels of the guide shaft by virtue of their being firmly urged against the teeth of the racks.

6 Claims, 3 Drawing Figures

APPARATUS FOR DETERMINATION OF COURSES ON NAUTICAL CHARTS ETC.

Several devices for settling courses on nautical charts are known. Examples of such known devices are disclosed in the Swedish patents 117,343 and 193,749. These known devices and almost all other known devices have the disadvantage that they require the navigator's both hands at handling of the device for determination of the course. It is not possible to obtain any exact parallel motion of the course rule with the aid of known devices, and the course rule cannot be locked on a certain, definite course, either, if desired. It is difficult to compensate for any magnetic variation in the known apparatuses. Another disadvantage of the known devices is that they as a rule have some kind of protective layer, for instance glass, between the course rule and the chart to prevent moisture from penetrating into the chart and to flatten the chart. This protective layer causes inferior exactness when reading the chart. The known devices have still another disadvantage, i.e., a reading device is often used, where the compass course may be quite erroneously read due to the fact that the reading device does not show in which quadrant the course is adherent to.

The present invention is to eliminate the above disadvantages and others and its characteristics appear from the characterizing clauses of the enclosed claims.

Figure 2:
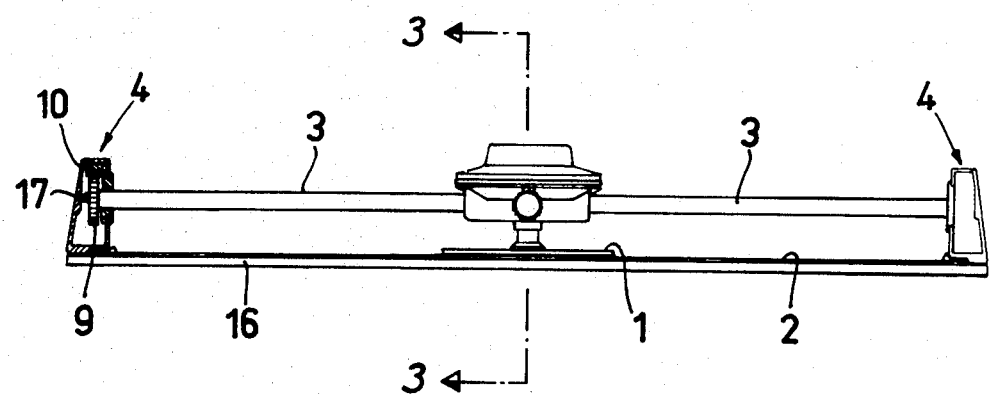
Figure 3:
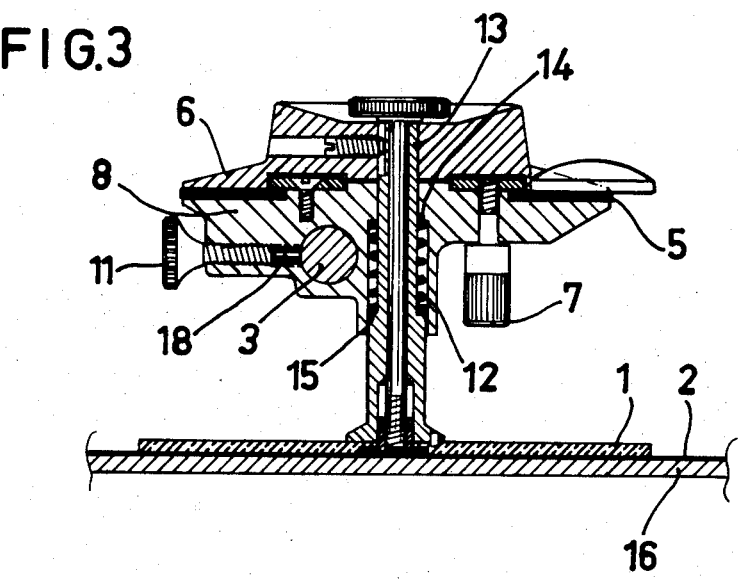

An illustrative example of the invention will now be explained in connection with the drawings, where FIG. 1 is a top view of the apparatus FIG. 2 is a section of the apparatus along the line 2—2 in FIG. 1 and FIG. 3 is a section along the line 3—3 in FIG. 2.

The apparatus consists of a bottom plate 16, a nautical chart 2 adapted to the bottom plate 16 and fed relative to the bottom plate by means of resilient means not shown in detail. At two opposite sides of the apparatus there are control means 4 attached to the bottom plate 16. These control means 4 receive the ends of a shaft 3, whose ends are provided with gear wheels 9. The control means 4 are correspondingly provided with racks 10 cooperating with the gear wheels 9. The gear wheel 9 of the shaft 3 is controlled by means of slides in the control means 4, not shown in detail, and also by spring-loaded plastic pins 17 located at the ends of the shaft 3 in order to cooperate with the racks 10. By this gear control a very exact parallel control of the shaft 3 relative to the bottom plate 16 is obtained and in this way also to the chart 2 placed thereon.

The shaft 3 runs through a frame 8 in a bushing 18 of a somewhat elastic material, such as plastic. In the frame 8 a screw 11 is screwed, which reaches the bushing 18 and can press same against the shaft 3 so that it is fixed relative to the frame 8. A graduated arc 5 (protractor), rests on the frame 8, and a pointer 6 is mounted above same. The pointer 6 and is manufactured from a transparent material, which has magnifying properties. The pointer 6 is connected to a course rule 1 but is is also possible to arrange instead the protractor 5 connected to the course rule 1. The connection between the indicating device 6 and the course rule 1 is made by a vertical shaft 13, which at one of its ends is provided with the replaceable course rule 1, which is graduated in nautical miles relative to the actual chart at its outer edges. The vertical shaft 13 is provide with a spring 12 resting against a flange of the vertical shaft 13 and the frame at 14. By this spring 12 the course rule 1 will be pressed against the chart 2 and in this way the course rule 1 will smooth out possible dents of the chart 2 at the course rule 1 and in its vicinity, i.e., where it is necessary to have a smooth and exact surface in the chart.

Protractor 5 can be loosened by means of the screw means 7 relative to the pointer 6, and in this way protractor can be displaced relative to the deflection. The protractor 5 is graduated in 360° and thanks to this no misunderstanding will arise regarding in which quadrant reading is to be made, i.e., which angular course is determined on the chart. Reading is made directly in number of grades and need not be compensated for possible variation in the chart, as this deflection has already been compensated by the screw means 7.

The end of the vertical shaft 13, which is not provided with the course rule 1 is provided with a wheel that can be easily gripped and the apparatus will be very easy to move and turn to the desired position by means of the wheel unless the screw 11 is screwed tightly against the bushing 18 and consequently also against the shaft 3.

Handling of the apparatus is very easy and will now be explained consecutively. The chart 2 is placed in the apparatus and fixed in correct position relative to this so that the meridians in the chart 2 are parallel to the shaft 3. After this the magnetic variation for the chart is set by loosening the screw means 7 and displacing the protractor 5. Then the course is determined by placing one edge of the course rule 1 with the course arrows in the direction of travel. The corresponding course in number of grades is then read directly from the marking of the pointer 6 on the protractor 5. At greater latitude changes between charts exchanged for each other also the course rule 1 is replaced with a course rule with different indications of nautical miles corresponding to the actual latitude position of the chart so that the actual distance of determined course can be read directly through the distance markings of the course rule. Of course the distance markings are not restricted to concern merely the distance of the course but any distance can be directly read from the chart in question through these markings.

By the existing direct connection between the course rule 1 and the pointer 6 all risks of erroneous reading of the protractor 5 are eliminated and through the exact control a safe parallel displacement of the frame 8 relative to the meridians is obtained. Through the present apparatus it is further achieved that the navigator can handle the apparatus by one hand and also directly read the distance without any complicated displacements or measurements in the chart, and the course rule 1 spring-loaded against the chart eliminates errors caused by irregularities of the chart without there being any collection of rubbish and scratches like a normal protective glass. Moreover, the navigator can lock the frame 8 relative to the shaft 3, if desired, and in this way the frame 8 is fixed notwithstandning the inclination of the apparatus or the ship. Therefore for instance the whole apparatus can be moved from one place to another without the set position being actuated.

I claim:

1. Apparatus for determining courses on a chart characterized by:

a. a rectangular plate which is adapted to hold a chart thereon,
b. parallel racks mounted along two opposite sides of said plate,
c. a guide shaft disposed above and parallel to said rectangular plate,
d. gear wheels provided at the opposite ends of said guide shaft,
e. said gear wheels being positioned to mesh with and engage the underside of said parallel racks,
f. a carrying device slideably mounted on said guide shaft so as to be moveable along said shaft,
g. said carrying device being associated with a course rule that is rotatable about a vertical shaft that is perpendicular to said plate,
h. said course rule being adapted to bear against a chart placed on said plate,
i. said parallel racks being spaced above said plate with the teeth of said racks facing said plate,
j. a spring force acting between the carrying device and the course rule so as to urge the course rule towards the chart and the carrying device away from the chart, whereby there is achieved great reading accuracy between the course rule and the chart and great exactness in the movement of the guide shaft in a direction normal to its axis is obtained by the gear wheels of the guide shaft by virtue of their being firmly urged against the teeth of the racks.

2. Apparatus as set forth in claim 1, wherein the shaft of the course rule is axially slidable in the carrying device, so that the course rule can be lifted some distance off the chart against the action of the spring force.

3. Apparatus as claimed in claim 2, wherein a coil spring is mounted around said shaft and is acting against a step in the carrying device and a step on said shaft.

4. Apparatus as set forth in claim 1, wherein the carrying device is adapted to be clamped to the guide shaft, whereby the carrying device and the course rule can be locked in any desired position.

5. Apparatus as set forth in claim 4 wherein said clamping is achieved by a frictional device comprising a screw and a plug of a resilient material with a high coefficient of friction, and thus said plug, upon screwing in said screw, presses against the guide shaft and thus prevents the clamping device from moving therealong as well as the guide shaft from rotating relative to the carrying device.

6. Apparatus as claimed in claim 4 wherein said resilient material is a relatively soft plastics material.

* * * * *